(12) United States Patent
Meister et al.

(10) Patent No.: US 10,025,030 B2
(45) Date of Patent: Jul. 17, 2018

(54) OPTOELECTRONIC COMPONENT HAVING A RESONATOR

(71) Applicant: Technische Universität Berlin, Berlin (DE)

(72) Inventors: Stefan Meister, Berlin (DE); Hanjo Rhee, Berlin (DE); Christoph Theiss, Berlin (DE); Aws Al-Saadi, Berlin (DE); Marvin Henniges, Berlin (DE); Muhammad Atif, Berlin (DE)

(73) Assignee: Technische Universitaet Berlin, Berlin (DE)

( * ) Notice: Subject to any disclaimer, the term of this patent is extended or adjusted under 35 U.S.C. 154(b) by 0 days.

(21) Appl. No.: 15/565,135

(22) PCT Filed: Apr. 12, 2016

(86) PCT No.: PCT/DE2016/200180
§ 371 (c)(1),
(2) Date: Oct. 6, 2017

(87) PCT Pub. No.: WO2016/165708
PCT Pub. Date: Oct. 20, 2016

(65) Prior Publication Data
US 2018/0100966 A1    Apr. 12, 2018

(30) Foreign Application Priority Data
Apr. 16, 2015   (DE) .................. 10 2015 206 847

(51) Int. Cl.
*G02B 6/00*  (2006.01)
*G02B 6/12*  (2006.01)
(Continued)

(52) U.S. Cl.
CPC ..... *G02B 6/12007* (2013.01); *G02B 6/29398* (2013.01); *G02F 1/0147* (2013.01); *G02F 2001/213* (2013.01)

(58) Field of Classification Search
CPC ............ G02B 6/12007; G02B 6/29398; G02F 1/0147; G02F 2001/213
See application file for complete search history.

(56) References Cited

U.S. PATENT DOCUMENTS 6,393,185 B1   5/2002  Deacon
8,805,130 B2 *  8/2014  Lipson et al. .... H01L 23/49827
                                              385/14
(Continued)

FOREIGN PATENT DOCUMENTS

DE   600 22 232 T2   6/2006
DE   600 33 839 T2   11/2007
(Continued)

OTHER PUBLICATIONS

International Search Report dated Sep. 6, 2016 issued in PCT/DE2016/200180.
(Continued)

*Primary Examiner* — Ellen Kim
(74) *Attorney, Agent, or Firm* — Gordon Rees Scully Mansukhani, LLP

(57) ABSTRACT

An optoelectronic component including an optical waveguide, an integrated optical resonator, in which the waveguide or at least a portion of the waveguide is arranged, and a heat source which can increase the temperature of the resonator during operation. A web region adjoins laterally the waveguide when viewed in the longitudinal direction of the waveguide. The web region forms a jacket portion of the
(Continued)

Figure 1:
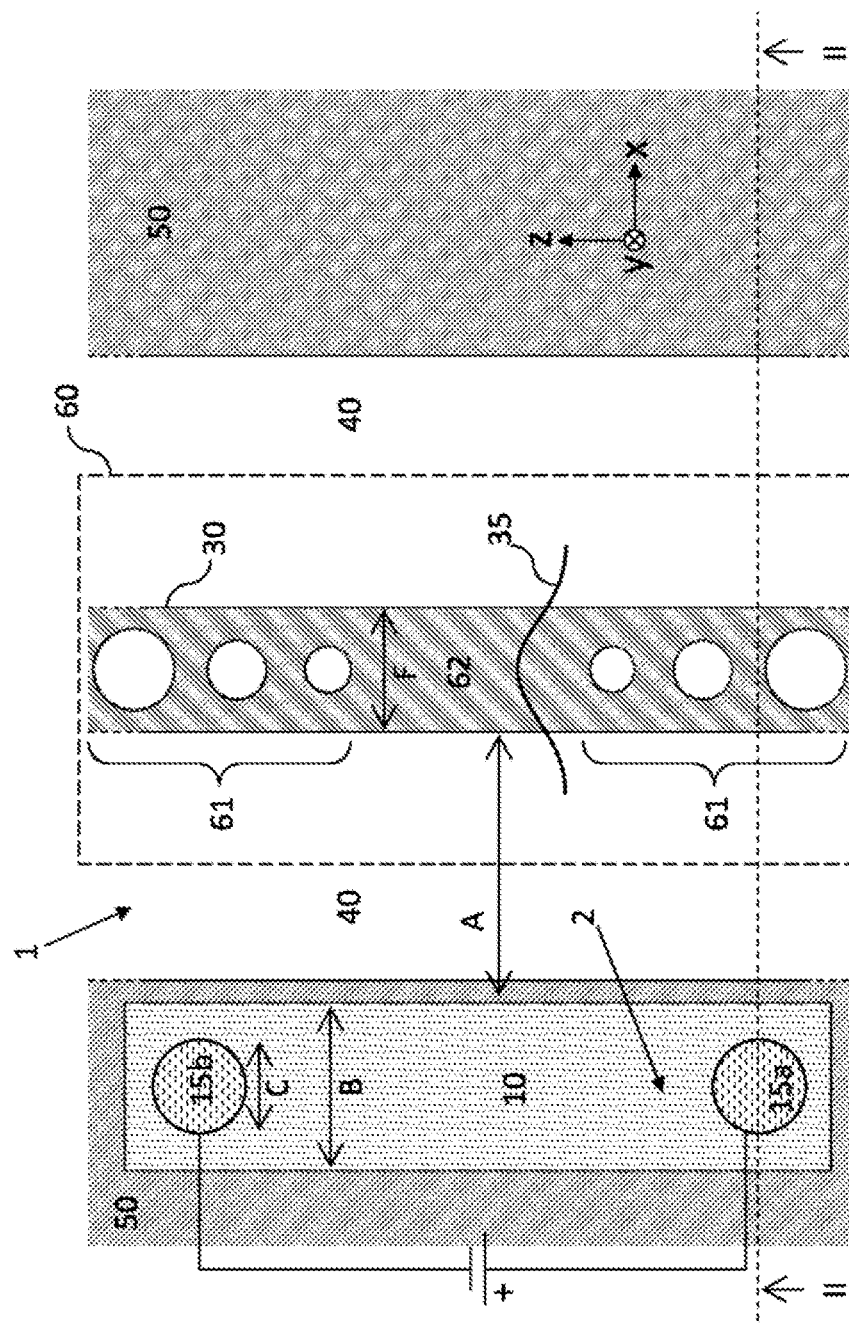

waveguide and has a smaller thickness than the waveguide. The heat source is thermally connected to the waveguide by means of the web region.

18 Claims, 10 Drawing Sheets

(51) Int. Cl.
  *G02B 6/293* (2006.01)
  *G02F 1/01* (2006.01)
  *G02F 1/21* (2006.01)

(56) References Cited

U.S. PATENT DOCUMENTS

| | | | |
|---|---|---|---|
| 8,938,139 B2* | 1/2015 | McLaren et al. | G02B 6/29338 385/17 |
| 9,366,822 B1* | 6/2016 | Lentine et al. | G02B 6/29395 385/14 |
| 2001/0028769 A1 | 10/2001 | Deacon | |
| 2010/0054653 A1 | 3/2010 | Carothers | |
| 2013/0182995 A1* | 7/2013 | Erickson et al. | G02B 6/12 385/14 |
| 2015/0132015 A1* | 5/2015 | Hayakawa | G02F 1/025 385/14 |
| 2016/0282700 A1* | 9/2016 | Nedovic | G02F 1/2257 385/14 |

FOREIGN PATENT DOCUMENTS

| | | |
|---|---|---|
| EP | 1 423 751 B1 | 8/2008 |
| EP | 1 699 120 B1 | 3/2009 |
| WO | WO 2009/032820 A1 | 3/2009 |

OTHER PUBLICATIONS

A. Masood et al.; "Comparison of heater architectures for thermal control of silicon photonic results," in GFP, 10th IEEE International Conference on Group IV Photonics, 2013, pp. 83-84.

A. Masood et al.; "Fabrication and characterization of CMOS-compatible integrated tungsten heaters for thermo-optic tuning in silicon photonics devices," Optical Materials Express, vol. 4, No. 7, p. 1383, 2014.

F. Gan, et al.; "Maximizing the Thermo-Optic Tuning Range of Silicon Photonic Structures," Research Laboratory of Electronic, Massachusetts Institute of Technology; Cambridge MA, IEEE 2007, pp. 67-68.

K. Padmaraju, et al. "Integrated thermal stabilization of a microring modulator," Optics Express, vol. 21, No. 12, pp. 14342-14350, Jun. 17, 2013.

L. Cao, et al.; "CMOS compatible micro-oven heater for efficient thermal control of silicon photonic devices," Optics Communications, vol. 305, pp. 66-70, 2013.

M. R. Watts, et al.; "Adiabatic Resonant Microrings (ARMs) with Directly Integrated Thermal Microphotonics," CLEO Conference on Lasers and Electro-Optics/Quantum Electronics and Laser Science Conference and Photonic Applications Systems Technologies: OSA, IEEE 2009.

Chin-Hui Chen, et al.; "A WDM Silicon Photonic Transmitter Based on Carrier-Injection Microring Modulators," HPL-2014-11, Feb. 21, 2014.

J. F. Song, et al.; "High efficiency optical switches with Heater-on-Slab (HoS) structures," Optical Fiber Communication Conference and Exposition and the National Fiber Optic Engineers Conference, Optical Society of America, 2011.

Hui Yu, et al.; "Compact Thermally Tunable Silicon Racetrack Modulators Based on an Asymmetric Waveguide," IEEE Photonics Technology Letters, vol. 25, No. 2, pp. 159-162, Jan. 15, 2013.

E. Timurdogan, et al.; "Vertical Junction Silicon Microdisk Modulator with Integrated Thermal Tuner," Conference on Lasers and Electro-Optics/Quantum Electronics and Laser Science Conference and Photonic Applications Systems Technologies, Optical Society of America, 2013.

Wim Bogaerts, et al; "A polarization-diversity wavelength duplexer circuit in silicon-on-insulator photonic wires", Feb. 9, 2007, vol. 15, No. 4, Optics Express, pp. 1567-1578.

Marcel W. Pruessner et al.; "Tunable Fabry-Perrot Waveguide Microcavities with High Index Contrast Mirrors"; Conference on Lasers and Electro-Optics, May 5-11, 2007, Baltimore, MD, OSA, Piscataway, NJ, May 6, 2007, pp. 1-2, XP031231178, ISBN: 978-1-55752-834-6, Sections 1 and 2, Figure 1.

C. Angulo Barrios, et al.; "Tunable silicon Fabry-Perot microcavity", Lasers and Electro-Optics 2004, CLEO Conference, San Francisco, CA, May 20-21, 2004, IEEE, vol. 2, May 20, 2004, pp. 728-730, XP010744764, ISBN: 978-1-55752-777-6, sections 1 and 2, figures 1,2.

\* cited by examiner

OPTOELECTRONIC COMPONENT HAVING A RESONATOR

The invention relates to an optoelectronic component having an optical waveguide, an integrated optical resonator, in which the waveguide or at least a portion of the waveguide is arranged, and a heat source which during operation can raise the temperature of the resonator.

An optoelectronic component of this kind is known from the publication "Adiabatic Resonant Microrings (ARMs) with Directly Integrated Thermal Microphotonics" (M. R. Watts, W. A. Zortman, D. C. Trotter, G. N. Nielson, D. L. Luck, and R. W. Young, in CLEO, conference contribution at the Conference on Lasers and Electro-Optics/Quantum Electronics and Laser Science Conference and Photonic Applications Systems Technologies: OSA, 2009).

The invention is based on the requirement to improve an optoelectronic component of the kind mentioned in the beginning as regards its optical properties.

According to the invention this requirement is met by an optoelectronic component with the characteristics as per patent claim 1. Advantageous designs of the component according to the invention are cited in the sub-claims.

Accordingly it is provided according to the invention that, viewed in longitudinal direction of the waveguide, a web region laterally adjoins the waveguide, the web region forming a jacket portion of the waveguide and having a smaller thickness than the waveguide, and the heat source is thermally connected to the waveguide by means of this web region.

An essential advantage of the component according to the invention is seen in the fact that the heat source does not directly adjoin the waveguide, in particular is not arranged directly above the waveguide, but is separated from this via a web region, which forms a jacket portion of the waveguide. By providing a web region between the waveguide and the heat source the optical losses in the waveguide can be reduced due to the presence of the heat source; even so, an efficient warming operation/heating operation of the heat source remains ensured.

The web region and the waveguide preferably consist of the same material.

With regard to the design of the waveguide it is regarded as advantageous if the waveguide, at least in a portion within the resonator, is a ridge waveguide, which comprises a waveguiding ridge and, viewed in longitudinal direction of the waveguide, comprises a web region both to the left and right of the ridge, which web region forms a jacket portion of the ridge waveguide and has a smaller layer thickness than the ridge.

It is particularly advantageous if a heat source, viewed in longitudinal direction of the waveguide, is arranged to the left of the ridge waveguide and is thermally connected to the waveguide by means of the left web region, and a heat source, viewed in longitudinal direction of the waveguide, is arranged to the right of the ridge waveguide and is thermally connected to the waveguide by means of the right web region.

With regard to the design of the web region it is regarded as advantageous if this comprises at least two web portions, namely a directly heatable web portion, on which the heat source lies or which has the heat source integrated in it, and a heat-conducting web portion, which itself does not have a heat source, is arranged between the heat source and the waveguide and conducts the heat of the heat source from the directly heatable web portion in the direction of the waveguide.

Preferably the heat source comprises an electric conductor region, which extends along the waveguide and can be heated by the current flow.

The electric conductor region preferably comprises a doped region in a semiconductor layer, which in the resonator forms the waveguiding layer of the waveguide or one of the waveguiding layers of the waveguide and/or the layer of the web region or one of the layers of the web region.

As regards the design of the electric conductor region it is moreover regarded as advantageous if this comprises a salicide layer on a semiconductor layer, which in the resonator forms the waveguiding layer of the waveguide or one of the waveguiding layers of the waveguide and/or the layer of the web region or one of the layers of the web region.

Moreover, as regards the design of the heat source a variant is regarded as advantageous which is characterized in that the optoelectronic component comprises a covering layer, which totally covers the waveguide and the web region or at least sections thereof, and the covering layer comprises a slit-shaped through-hole which, in its hole longitudinal direction, extends along the waveguide and is filled with an electrically conductive material, and the electric conductor region of the heat source at least also comprises the slit-shaped through-hole filled with the electrically conductive material.

With regard to an optimal heat distribution of the heat source and with regard to an optimal degree of efficiency it is regarded as advantageous if the cross-section of the electric conductor region varies in longitudinal direction of the waveguide.

As regards the arrangement of the heat source, it is provided with respect to a particularly preferred design of the component that the heat source, viewed in longitudinal direction of the waveguide, lies laterally directly adjacent to the resonator, and the heat source is thermally connected by means of the web region to a waveguide portion, which forms a waveguiding component of the integrated optical resonator.

With another equally advantageous design of the component it is provided that the heat source is thermally connected by means of the web region to a waveguide portion, which, viewed in longitudinal direction of the waveguide, lies in front of or behind the resonator. The heat flow in this case will take place at least via the waveguide itself into the resonator.

Preferably the component comprises a working point adjustment device, which comprises the heat source, a detection unit for detecting a measured variable indicating the respective working point of the component and a control unit, which controls the heat source as a function of the measured variable of the detection unit, in particular adjusts the current through the electric conductor region of the heat source.

As regards the design of the working point adjustment device it is advantageous if this detects an optical output signal of the component, and the control unit is designed such that it controls the heat source as a function of the optical output signal, in particular the amplitude or wavelength of the optical output signal.

The resonator is preferably a Fabry-Pérot resonator, a ring resonator or a micro disk resonator.

If the resonator is a Fabry-Pérot resonator, it is advantageous if this forms part of a Fabry-Pérot modulator. If the resonator is a Fabry-Pérot resonator it is also advantageous if this is equipped with resonator mirrors, which are formed from holes or slits in the waveguide or formed by modulating the waveguide width.

The waveguide inside the resonator is preferably straight.

The heat source preferably does not overlap with the optical mode or modes propagating in the waveguide.

At least two heat sources are preferably placed symmetrically around the waveguide.

With a particularly advantageous design of the optoelectronic component it is provided that the electric conductor region comprises a doped region in a semiconductor layer or a salicide layer on a semiconductor layer, and this semiconductor layer in the resonator forms the waveguiding layer of the waveguide or one of the waveguiding layers of the waveguide as well as the layer of the web region or one of the layers of the web region.

With the last-mentioned embodiment it is moreover advantageous if the waveguide, at least in a portion within the resonator, is a ridge waveguide, which comprises a waveguiding ridge and, viewed in longitudinal direction of the waveguide, comprises a web region both to the left and right of the ridge, which web region forms a jacket portion of the ridge waveguide and has a smaller layer thickness than the ridge, and the web regions and the waveguiding ridge are formed by the same semiconductor layer.

The web regions and the waveguiding ridge are preferably formed by the same silicon layer.

The waveguide therefore is preferably a silicon ridge waveguide with a waveguiding semiconductor layer consisting of silicon. The ridge and the adjacent web regions therefore preferably consist of silicon material in each case. The waveguiding silicon layer preferably lies on a silicon dioxide layer. In other words, the waveguide is therefore preferably an SOI ridge waveguide or a silicon waveguide based on SOI material.

Figure 2:
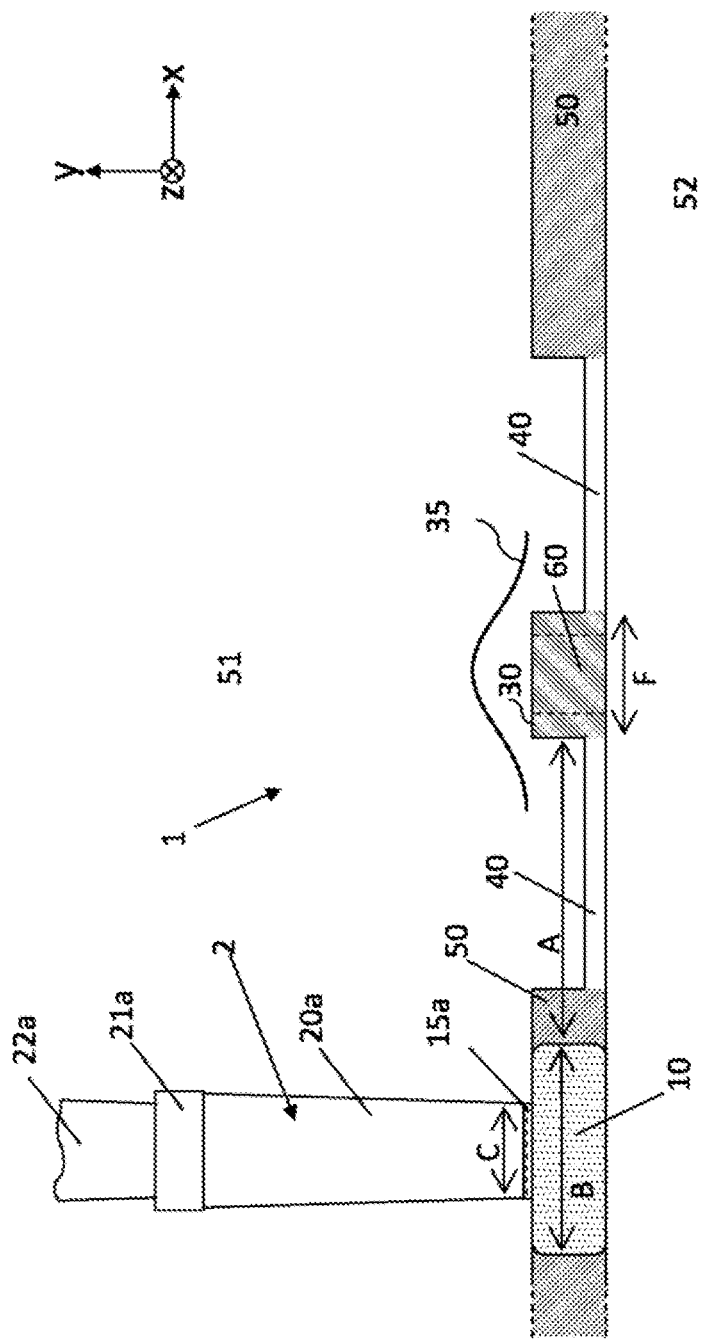
Figure 3:
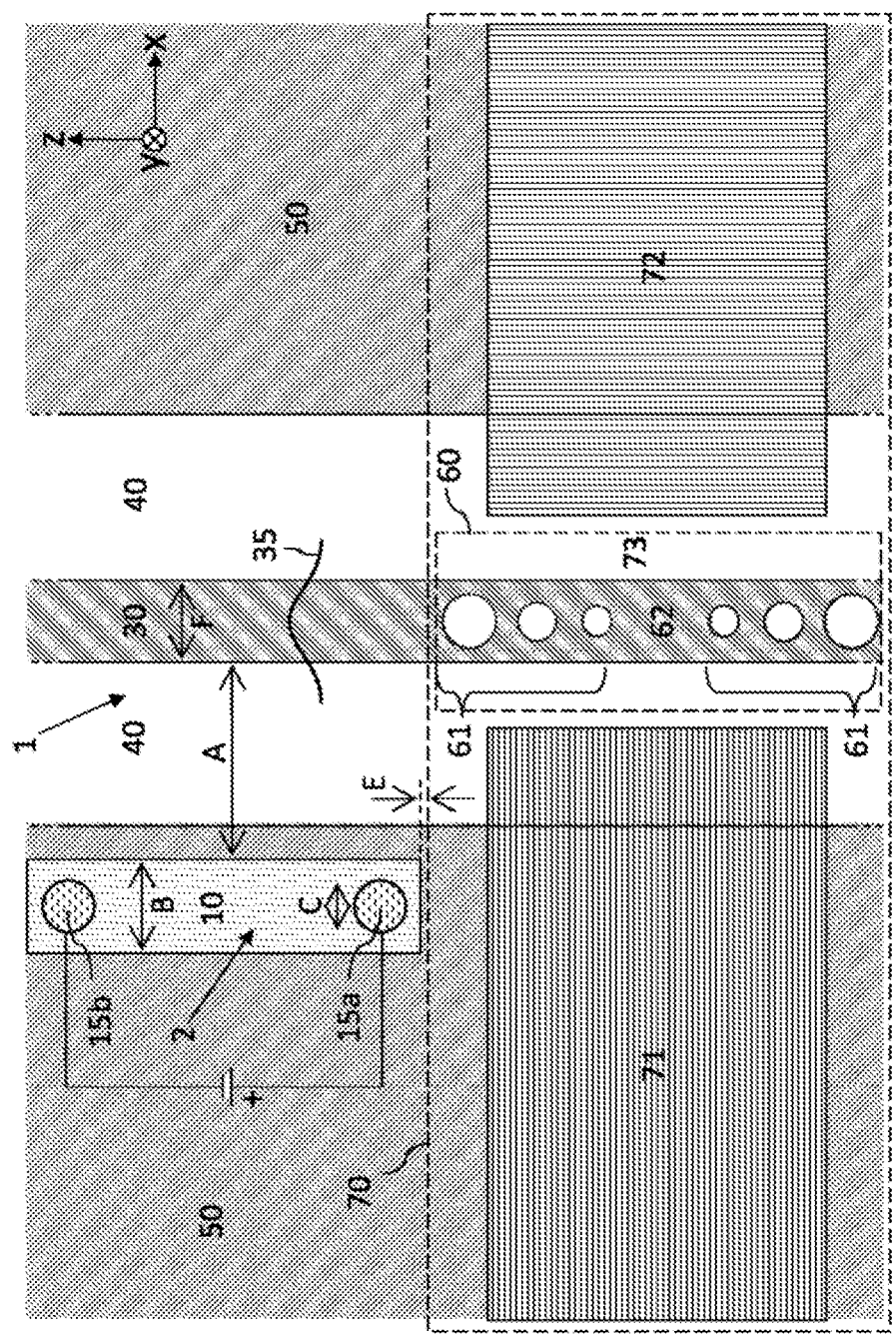
Figure 4:
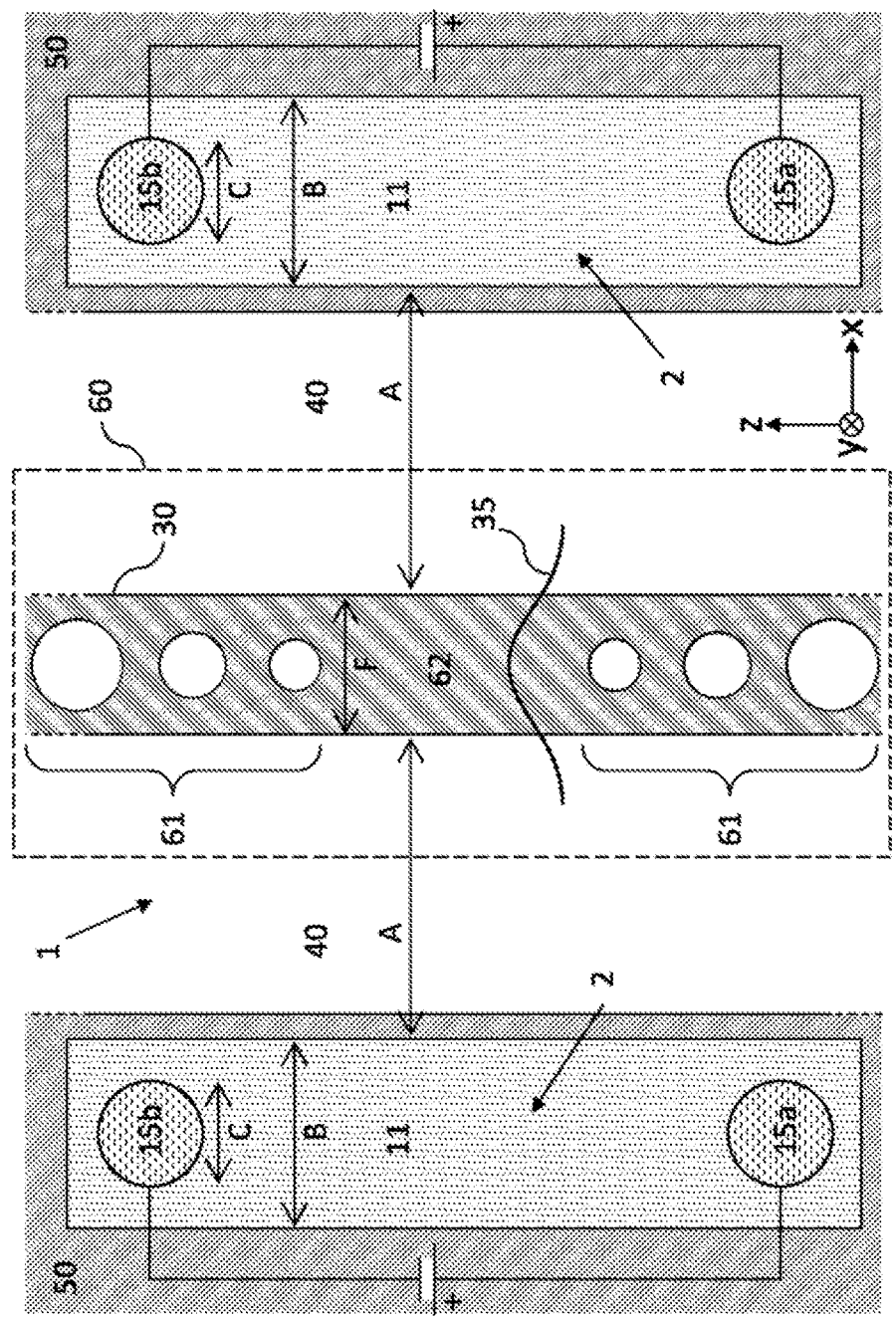
Figure 5:
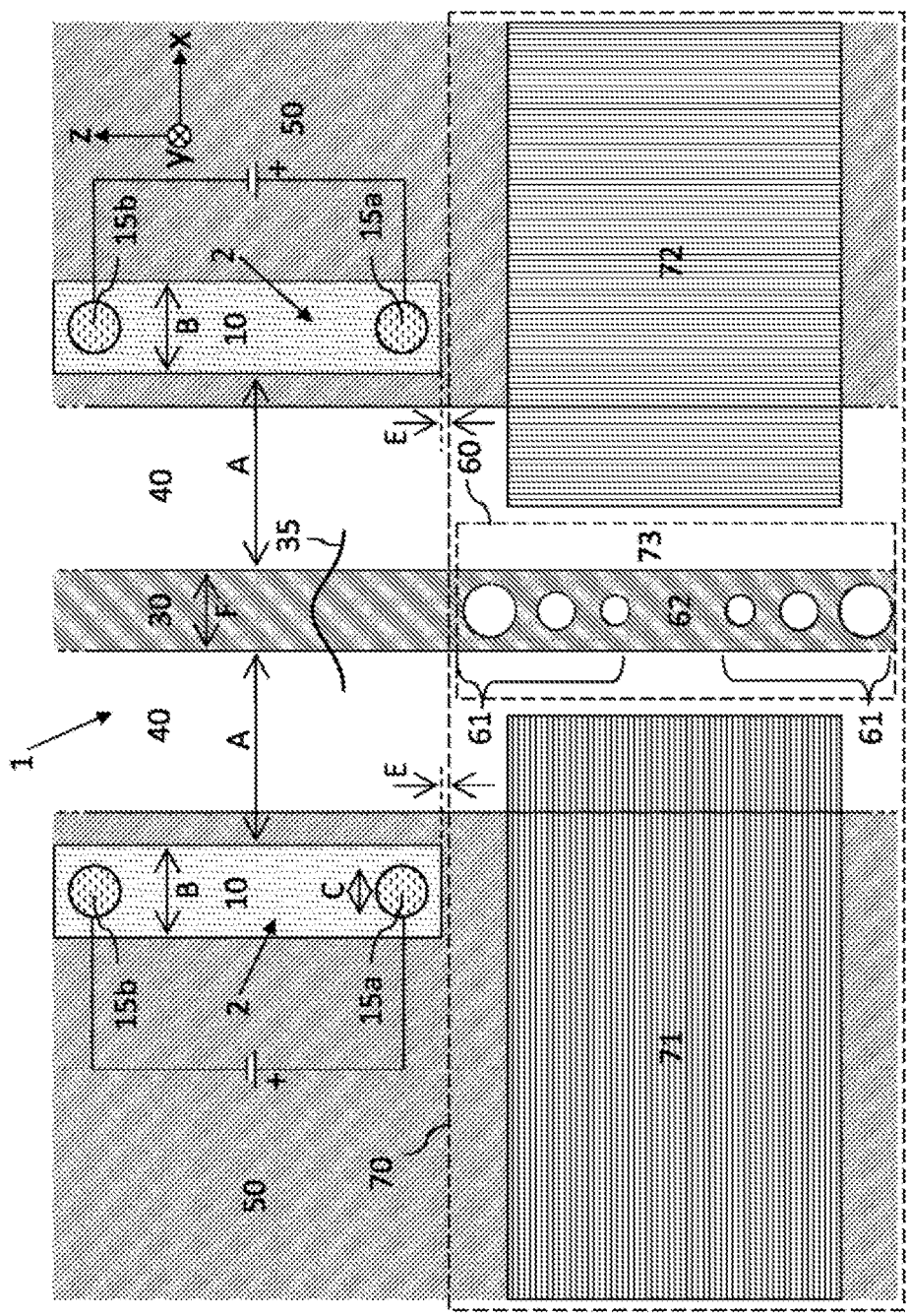
Figure 6:
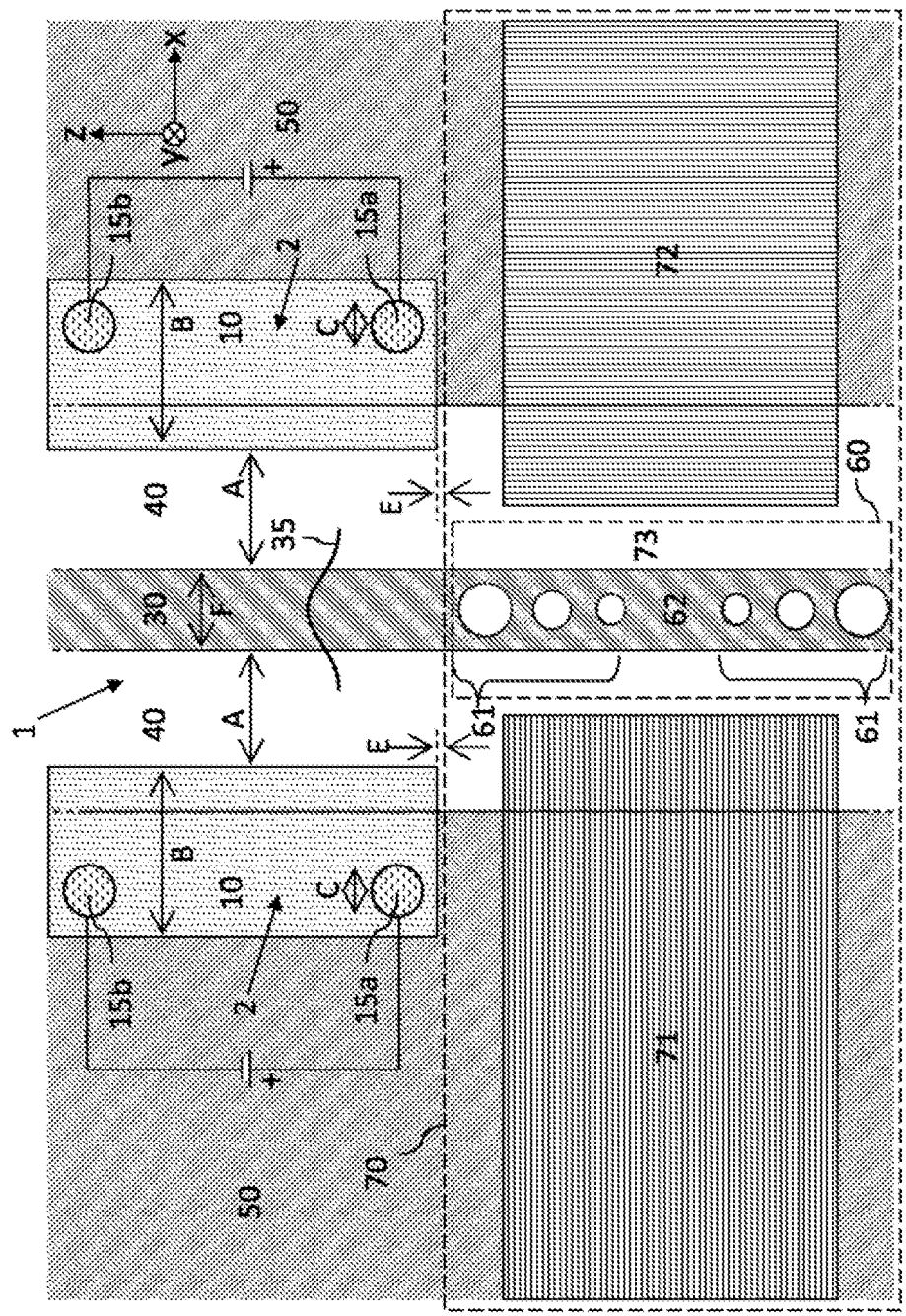
Figure 7:
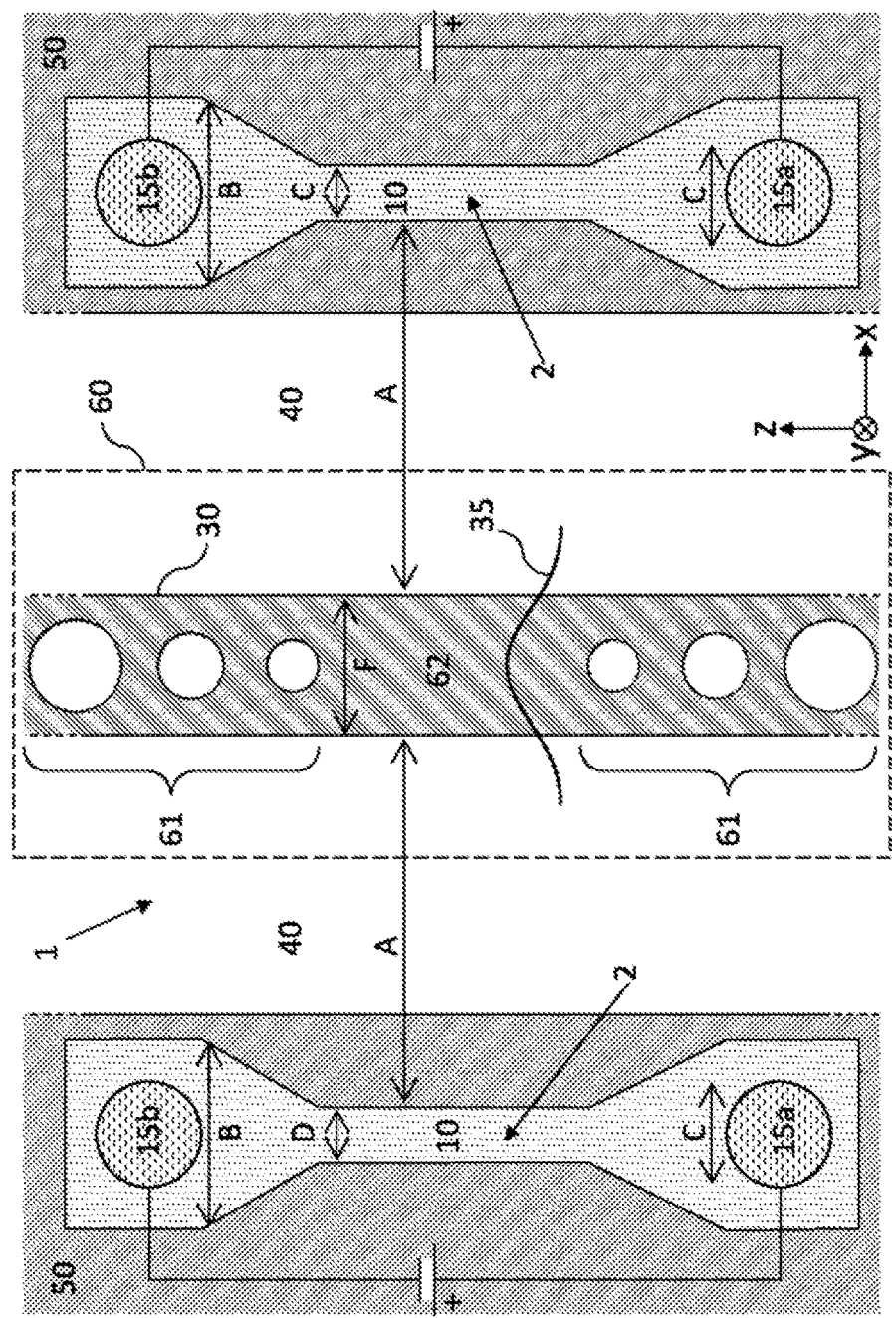
Figure 8:
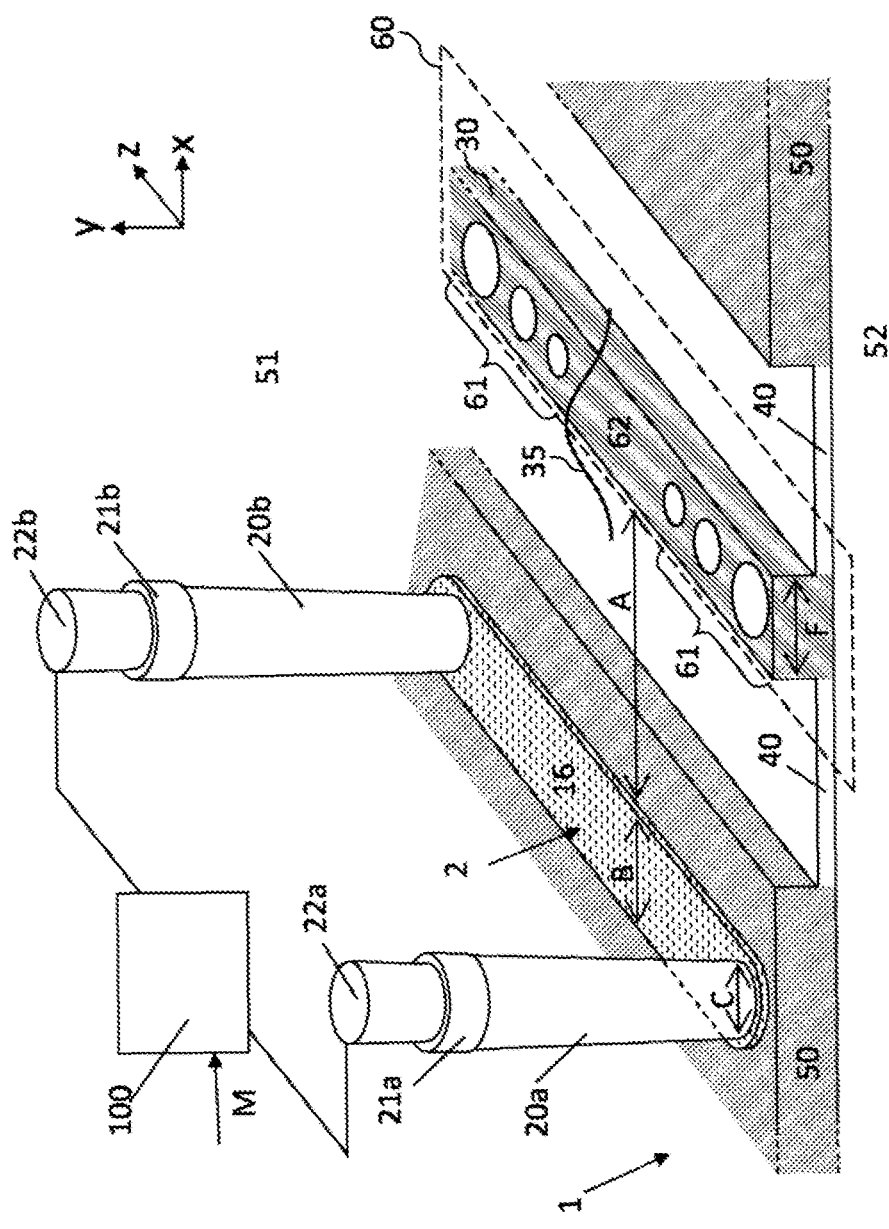
Figure 9:
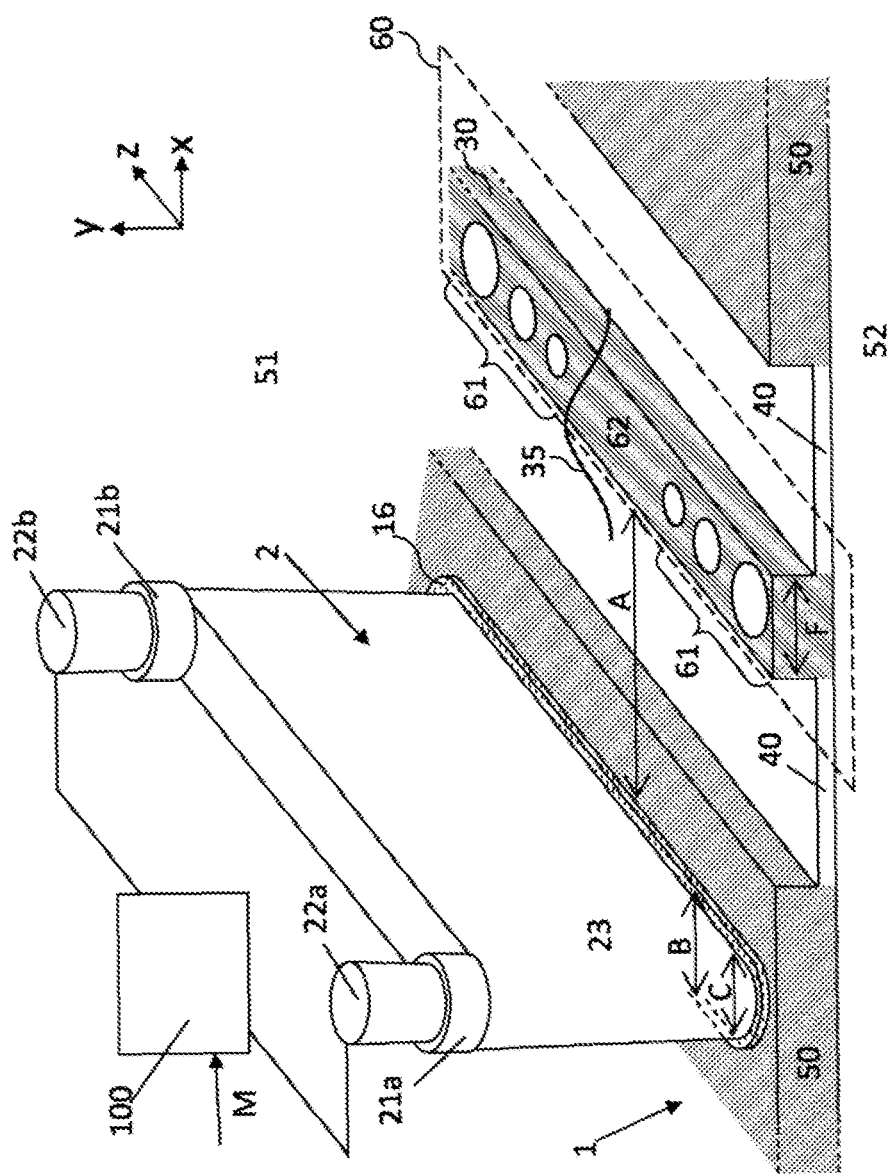
Figure 10:
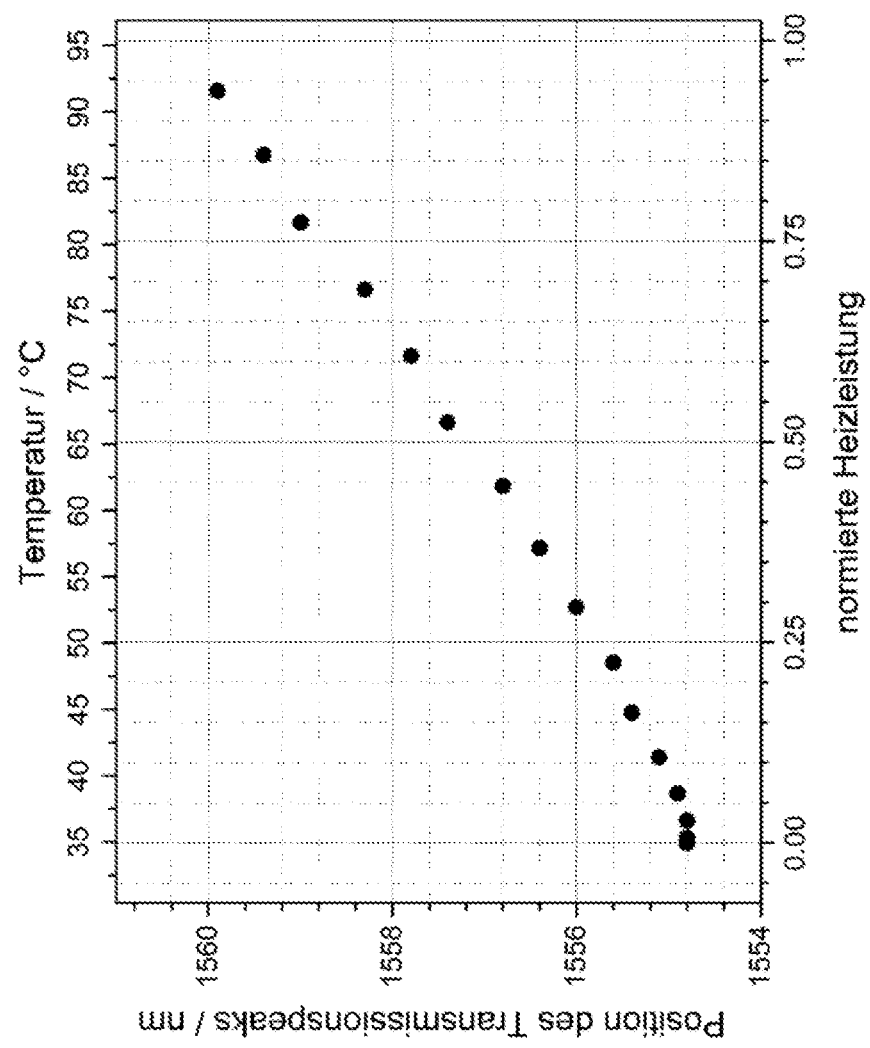

The invention will now be explained in detail with reference to exemplary embodiments; in the drawing, in an exemplary manner, FIG. 1 shows a top view of an exemplary embodiment of an optoelectronic component equipped with a heat source, FIG. 2 shows the component as per FIG. 1 in a cross-section, FIG. 3 shows an exemplary embodiment of an optoelectronic component, in which a heat source, viewed in longitudinal direction of the waveguide, is arranged in front of or behind the resonator, i.e. outside the resonator, FIG. 4 shows an exemplary embodiment of an optoelectronic component according to the invention, in which two heat sources are arranged to the right and left of a resonator, FIG. 5 shows an exemplary embodiment of an optoelectronic component according to the invention, in which two heat sources, viewed in longitudinal direction of the waveguide, are arranged outside the resonator, FIG. 6 shows an exemplary embodiment of an optoelectronic component according to the invention, in which heat sources extend into the web region next to the waveguide, FIG. 7 shows an exemplary embodiment of an optoelectronic component according to the invention, in which two heat sources are present, the cross-section of which changes in longitudinal direction of the wave guide, FIG. 8 shows an exemplary embodiment of an optoelectronic component according to the invention, in which a heat source is formed by a salicide layer, FIG. 9 shows an exemplary embodiment of an optoelectronic component according to the invention, in which a heat source comprises a slit-shaped through-hole filled with a conductive material, and FIG. 10 shows an exemplary measurement of the wavelength dependence of a transmission peak of a Fabry-Pérot resonator in a waveguide as a function of the respective heat output/the temperature introduced by the heat source.

In the figures, for clarity's sake, identical or comparable components are marked throughout with the same reference symbol.

FIG. 1 shows a first exemplary embodiment of an optoelectronic component 1. The optoelectronic component 1 comprises a heat source 2 for temperature control, consisting of an n-doped semiconductor region 10 in an undoped semiconductor region 50, which is placed adjacent to a Fabry-Pérot resonator 60 present in a straight waveguide 30. The Fabry-Pérot resonator 60 comprises two Fabry-Pérot resonator mirrors 61 and a Fabry-Pérot resonator cavity 62.

The n-doped semiconductor region 10 has the width B laterally to the waveguide 30. When applying a voltage to a salicide 15a and 15b with the diameter C, a conversion of electric current into heat takes place due to the electrical resistance of the n-doped semiconductor region 10. Subsequently heat transport again takes place via a web region 40 (see also FIG. 2) to the waveguide 30, causing a temperature change in the waveguide 30 and thus also in the Fabry-Pérot resonator mirrors 61 and the Fabry-Pérot resonator cavity 62. As a result the transmission properties of the Fabry-Pérot resonator 60 can be selectively controlled.

The heat source 2 is, viewed in longitudinal direction of the waveguide 30, arranged to the left of the ridge waveguide and thermally connected via the left web region 40 to the waveguide 30.

Both the n-doped semiconductor region 10 and the salicide 15a and 15b are at a distance A to the waveguide 30, so that no overlap occurs with the optical mode 35 guided in the waveguide 30, namely in order to avoid absorption losses. N-doping of the semiconductor region 10 is advantageous due to the higher electrical resistance in comparison to p-doping.

The lower limit for the total size of the Fabry-Pérot resonator 60 is not limited by the diameter C or the position of the salicide 15a and 15b for the electrical contacting of the heat source and the size and position of the n-doped semiconductor region 10.

Due to the heat propagation being restricted to the level of the semiconductor layer 50, the heat efficiency in the exemplary embodiment as per FIG. 1 is advantageously increased in comparison to heat sources which are positioned above the waveguide 30 and are separated from the waveguide 30 by an oxide 51, here in the form of an oxide layer.

The heat dissipation for cooling the Fabry-Pérot resonator 60 is effected laterally to the waveguide 30, without the dissipated heat having to pass through a waveguide, as e.g. is the case in a ring resonator.

FIG. 2 shows a cross-section as per cutting line II-II of the exemplary embodiment in FIG. 1. The optical mode 35 guided in the waveguide 30 has a field distribution, which is determined by the refractive indices of the material of the waveguide 30 and the materials surrounding the waveguide 30. The oxide 51 is above and partially next to the waveguide 30 and an insulator 52 is below the waveguide 30.

The web region 40 and the waveguide 30 in the exemplary embodiment as per FIGS. 1 and 2 consist of the same material.

The waveguide 30, at least in a portion within the resonator, is preferably a ridge waveguide, which comprises a waveguiding ridge and, viewed in longitudinal direction of the waveguide, comprises a web region 40 both to the left and right of the ridge. The web regions 40 each form a jacket portion of the ridge waveguide and have a smaller layer thickness than the ridge.

The heat source 2, viewed in longitudinal direction of the waveguide 30, in the diagram and in the viewing direction as per FIG. 2, is arranged to the left of the ridge waveguide and is thermally connected to the waveguide 30 by means of the left web region 40.

The heat source 2 comprises the salicide 15*a*, which contains a metal-filled through-hole 20*a* made in the oxide 51. The metal filling in the through-hole 20*a* is connected to a wire 21*a*, which in turn is electrically contacted via a further through-hole 22*a* with further wires above it.

FIG. 3 shows a further embodiment for an optoelectronic component 1, which is fitted with a heat source 2. A Fabry-Pérot resonator 60 is placed as in FIG. 1 in a waveguide 30 of the optoelectronic component 1. To the left and right of the waveguide 30 are an anode 71 and a cathode 72. The intrinsic area 73 covers the volume between anode 71 and cathode 72, which together fulfill the function of a diode. In combination with the Fabry-Pérot resonator 60 centrally arranged in the intrinsic area 73, this therefore constitutes an electro-optic Fabry-Pérot modulator 70.

The heat source 2 described in FIGS. 1 and 2 here consists of an n-doped semiconductor region 10 and is placed, viewed in longitudinal direction of the waveguide, in parallel to the waveguide 30 behind or in front of the electro-optic Fabry-Pérot modulator 70, with the distance E between the n-doped semiconductor region 10 and the electro-optic Fabry-Pérot modulator 70 being as small as possible. In order to avoid parasitic electric currents between the heat source and the electro-optic Fabry-Pérot modulator 70, it is important to adhere to a minimum value for the distance E. In order to minimize the heat transport distance, the distance A between the n-doped semiconductor region and the waveguide 30 should also be as small as possible, without an overlap between the n-doped semiconductor region 10 and the guided optical mode 35 leading to absorption losses.

FIG. 4 shows an exemplary embodiment for an optoelectronic component 1, which has two heat sources 2. The heat sources 2 serve to control the temperature of a Fabry-Pérot resonator 60. In difference to the exemplary embodiment shown in FIG. 1, the heat sources 2 here are realized as p-doped semiconductor regions 11. The two preferably identical heat sources 2 are placed at a distance A symmetrically to the left and right of the waveguide 30. This ensures a symmetrical heat input into the Fabry-Pérot resonator 60, so that the field distribution of the guided optical mode is also symmetrically altered via the generated change in the refractive index, which is advantageous with regard to the propagation losses in the waveguide 30. In order to achieve a temperature change across the entire waveguide width F, account must be taken, in the case of a heat source being placed on one side only, of the maximum distance A+F for the heat transport. If two heat sources are placed symmetrically on both sides, the maximum distance for the heat transport is reduced to A+0.5 F, thereby increasing the heating efficiency.

FIG. 5 shows a further exemplary embodiment for an optoelectronic component 1, which is equipped with two heat sources 2 for the temperature control of an electro-optic Fabry-Pérot modulator 70. In difference to the exemplary embodiment shown in FIG. 3, the two preferably identical heat sources 2 realized as n-doped semiconductor regions 10 are placed at a distance A symmetrically to the left and right of the waveguide 30 and at a distance E in the direction of the waveguide 30 behind or in front of the electro-optic Fabry-Pérot modulator 70. This ensures a symmetrical heat input into the Fabry-Pérot modulator 70, as a result of which the field distribution of the guided optical mode is also symmetrically altered via the generated change in the refractive index, which is advantageous as regards the propagation losses in the waveguide 30. In order to achieve a change in temperature across the entire waveguide width F, account must be taken, in the case of a heat source being placed on one side only, of the maximum distance A+F for the heat transport. If two heat sources are placed symmetrically on both sides, the maximum distance for the heat transport is reduced to A+0.5 F, thereby increasing the heating efficiency.

FIG. 6 shows a further exemplary embodiment for an optoelectronic component 1, which is fitted with two heat sources 2 for the temperature control of an electro-optic Fabry-Pérot modulator 70. In difference to the exemplary embodiment shown in FIG. 5, the n-doped semiconductor regions 10 extend as far as into the web region 40. Due to this arrangement, the distance of the n-doped semiconductor regions 10 from the waveguide 30 can be reduced, so that the distance A is also reduced and the heat efficiency is thus improved. As the distance A between waveguide 30 and n-doped semiconductor regions 10 reduces, absorption of optical radiation, which propagates in the waveguide 30, increases. Therefore a balance must be found for the distance A, which combines high heat efficiency with tolerable optical losses.

FIG. 7 shows a further exemplary embodiment for an optoelectronic component 1, which is fitted with two heat sources 2 for the temperature control of an electro-optic Fabry-Pérot modulator 70. In difference to the exemplary embodiment shown in FIG. 4, the heat sources are realized here as n-doped semiconductor regions 10. In addition the width lateral to the waveguide 30 of the n-doped semiconductor regions 10 narrows from the width B in the vicinity of the salicide 15*a* and 15*b* and the vertical metal-filled through-holes 20, 20*b* in each case above the salicide to the width D in the center of the n-doped semiconductor regions 10, parallel to the direction of the waveguide 30. The reduction in the cross-section, associated with the narrowing, of the n-doped semiconductor region 10 causes an increase in the electrical resistance. Thus there occurs a stronger heat build-up in this portion with the width D, whereby the heat efficiency is increased.

FIG. 8 shows a variant of the exemplary embodiment as per FIG. 1, in which there is no n-doped or p-doped semiconductor region, and instead, an extruded salicide 16 is used which is in the form of a strip parallel to the direction of the waveguide 30 as heat source. The thinner layer thickness of the silicide allows a spatially stronger, localized heat source to be realized.

In addition FIG. 8 shows a control unit 100 which controls the heat source 2 as a function of a measured variable M of a detection unit, not shown for reasons of clarity, which control unit in particular adjusts the current through the electric conductor region of the heat source. The detection unit preferably serves to detect a measured variable indicating the respective working point of the component 1.

The heat source 2, the detection unit for detecting the measured variable M indicating the respective working point of the component 1 and the control unit 100 form a working point adjustment device of the component 1.

The detection unit preferably detects the optical output signal of the component 1, and the control unit 100 preferably activates the heat source 2 as a function of the optical output signal, in particular the amplitude or wavelength of the optical output signal.

FIG. 9 shows a variant of the exemplary embodiment according to the invention as per FIG. 8 in an isometric diagram. Additionally to the extruded salicide 16 on an undoped semiconductor region 50, an extruded vertical metal-filled through-hole 23 in the oxide 51 is realized here in parallel to the direction of the waveguide 30 as a heat source for a Fabry-Pérot resonator 60. This variant allows a spatially more extended heat source to be realized.

FIG. 10 shows a graph, in which the spectral wavelength displacement of the transmission peak of a Fabry-Pérot resonator is plotted as a function of the supplied heat output versus the temperature generated in the Fabry-Pérot resonator. The wavelength of the transmission peak can be controlled in an area several nanometers wide.

The waveguide 30 preferably is a silicon ridge waveguide, which is formed in a waveguiding semiconductor layer consisting of silicon. The ridge/the waveguide 30 and the adjacent web regions 40 thus preferably consist of silicon material, respectively. The waveguiding silicon layer preferably lies on an oxide 51 consisting of silicon dioxide, in particular a silicon dioxide layer. In other words, the waveguide is preferably an SOI ridge waveguide or a silicon waveguide based on SOI material.

The layer thickness of the silicon layer in the area of the waveguide 30/the ridge lies preferably in a range between 150 nm and 300 nm. The layer thickness in the adjacent web regions 40 lies preferably in a range between 50 nm and 200 nm. The ratio between the ridge height, i.e. the layer thickness in the ridge area, and the layer thickness in the adjacent web regions 40 preferably lies in a range between 1.2 and 4.5.

Although the invention has been illustrated and described in more detail by way of preferred exemplary embodiments, the invention is not limited by the disclosed examples, and other variations may be derived therefrom by the expert without departing from the protective scope of the invention.

LIST OF REFERENCE SYMBOLS 1 optoelectronic component
2 heat source
10 n-doped semiconductor region
11 p-doped semiconductor region
15a/b salicide
16 extruded salicide
20a/b through-hole
21a/b wire
22a/b further through-hole
23 extruded through-hole
30 waveguide
35 waveguide mode intensity/optical mode
40 web region
50 undoped semiconductor region
51 oxide layer
52 insulator
60 Fabry-Pérot resonator
61 Fabry-Pérot resonator mirror
62 Fabry-Pérot resonator cavity
70 Fabry-Pérot modulator
71 anode
72 cathode
73 intrinsic area
100 control unit
A distance of heat source to waveguide
B width of heat source in x-direction
C diameter of through-hole on salicide
D narrowed width of heat source in x-direction
E distance of heat source to modulator
F waveguide width
M measured variable
X x-direction of the drawn coordinate system
Y y-direction of the drawn coordinate system
Z z-direction of the drawn coordinate system

The invention claimed is:

1. An optoelectronic component (1) having
an optical waveguide (30),
an integrated optical resonator (60), in which the waveguide (30) or at least a portion of the waveguide (30) is arranged, and
a heat source (2) which during operation can raise the temperature of the resonator (60),
characterized in that,
viewed in longitudinal direction of the waveguide (30), a web region (40) laterally adjoins the waveguide (30), the web region forming a jacket portion of the waveguide (30) and having a smaller thickness than the waveguide (30), and
the heat source (2) is thermally connected to the waveguide (30) by means of this web region (40).

2. The optoelectronic component (1) as claimed in claim 1, characterized in that
the electric conductor region (10, 11) comprises a doped region in a semiconductor layer or a salicide layer (15a, 15b) on a semiconductor layer, and
this semiconductor layer in the resonator (60) forms the waveguiding layer of the waveguide (30) or one of the waveguiding layers of the waveguide (30) as well as the layer of the web region (40) or one of the layers of the web region (40).

3. The optoelectronic component (1) as claimed in claim 2, characterized in that
the waveguide (30), at least in a portion within the resonator (60), is a ridge waveguide, which comprises a waveguiding ridge and, viewed in longitudinal direction of the waveguide (30), comprises a web region (40) both to the left and right of the ridge, which web region forms a jacket portion of the ridge waveguide and has a smaller layer thickness than the ridge, and
the web regions (40) and the waveguiding ridge are formed by the same semiconductor layer.

4. The optoelectronic component (1) as claimed in claim 2, characterized in that the web regions (40) and the waveguiding ridge are formed by the same silicon layer.

5. The optoelectronic component (1) as claimed in claim 1, characterized in that the web region (40) and the waveguide (30) consist of the same material.

6. The optoelectronic component (1) as claimed in claim 1, characterized in that the waveguide (30), at least in a portion within the resonator (60), is a ridge waveguide, which comprises a waveguiding ridge and, viewed in longitudinal direction of the waveguide (30), comprises a web region (40) both to the left and right of the ridge, which web region forms a jacket portion of the ridge waveguide and has a smaller layer thickness than the ridge.

7. The optoelectronic component (1) as claimed in claim 6, characterized in that
a heat source (2), viewed in longitudinal direction of the waveguide (30), is arranged to the left of the ridge waveguide and is thermally connected to the waveguide (30) by means of the left web region (40), and
a heat source (2), viewed in longitudinal direction of the waveguide (30), is arranged to the right of the ridge waveguide and is thermally connected to the waveguide (30) by means of the right web region (40).

8. The optoelectronic component (1) as claimed in claim 1, characterized in that the web region (40) comprises at least two web portions, namely
a directly heatable web portion, on which the heat source (2) lies or which has the heat source (2) integrated in it, and
a heat-conducting web portion, which itself does not have a heat source, is arranged between the heat source (2) and the waveguide (30) and conducts the heat of the heat source (2) from the directly heatable web portion in the direction of the waveguide (30).

9. The optoelectronic component (1) as claimed in claim 1, characterized in that the heat source (2) comprises an electric conductor region (10, 11), which extends along the waveguide (30) and can be heated by the current flow.

10. The optoelectronic component (1) as claimed in claim 9, characterized in that the electric conductor region (10, 11) comprises a doped region in a semiconductor layer, which in the resonator (60) forms the waveguiding layer of the waveguide (30) or one of the waveguiding layers of the waveguide (30) and/or the layer of the web region (40) or one of the layers of the web region (40).

11. The optoelectronic component (1) as claimed in claim 9, characterized in that the electric conductor region (10, 11) comprises a salicide layer (15a, 15b) on a semiconductor layer, which in the resonator (60) forms the waveguiding layer of the waveguide (30) or one of the waveguiding layers of the waveguide (30) and/or the layer of the web region (40) or one of the layers of the web region (40).

12. The optoelectronic component (1) as claimed in claim 9, characterized in that
the optoelectronic component (1) comprises a covering layer, which totally covers the waveguide (30) and the web region (40) or at least sections thereof, and
the covering layer comprises a slit-shaped through-hole (23) which, in its hole longitudinal direction, extends along the waveguide (30) and is filled with an electrically conductive material, and
the electric conductor region (10, 11) of the heat source (2) at least also comprises the slit-shaped through-hole (23) filled with the electrically conductive material.

13. The optoelectronic component (1) as claimed in claim 9, characterized in that the cross-section of the electric conductor region (10, 11) varies in longitudinal direction of the waveguide (30).

14. The optoelectronic component (1) as claimed in claim 1, characterized in that
the heat source (2), viewed in longitudinal direction of the waveguide (30), lies laterally directly adjacent to the resonator (60), and
the heat source (2) is thermally connected by means of the web region (40) to a waveguide portion, which forms a waveguiding component of the integrated optical resonator (60).

15. The optoelectronic component (1) as claimed in claim 1, characterized in that the heat source (2) is thermally connected by means of the web region (40) to a waveguide portion, which, viewed in longitudinal direction of the waveguide (30), lies in front of or behind the resonator (60).

16. The optoelectronic component (1) as claimed in claim 9, characterized in that the component (1) comprises a working point adjustment device, which comprises the heat source (2), a detection unit for detecting a measured variable indicating the respective working point of the component (1) and a control unit, which controls the heat source (2) as a function of the measured variable of the detection unit, in particular adjusts the current through the electric conductor region (10, 11) of the heat source (2).

17. The optoelectronic component (1) as claimed in claim 16, characterized in that
the detection unit detects the optical output signal of the component (1), and
the control unit is designed such that it controls the heat source (2) as a function of the optical output signal, in particular the amplitude or wavelength of the optical output signal.
signal.

18. The optoelectronic component (1) as claimed in claim 1, characterized in that the resonator (60) is a Fabry-Pérot resonator (60), a ring resonator or a micro disk resonator (60).

* * * * *